United States Patent [19]

Martin

[11] Patent Number: 4,629,046
[45] Date of Patent: Dec. 16, 1986

[54] FLUID FRICTION CLUTCH

[75] Inventor: Hans Martin, Stuttgart, Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 617,553

[22] Filed: Jun. 5, 1984

[30] Foreign Application Priority Data

Jun. 15, 1983 [DE] Fed. Rep. of Germany ....... 3321616

[51] Int. Cl.$^4$ .............................................. F16D 31/00
[52] U.S. Cl. ................... 192/58 B; 192/82 T
[58] Field of Search ................ 192/58 B, 58 R, 85 R, 192/85 F, 87.12, 103 A, 103 B, 103 FA, 113 R, 113 B; 251/141

[56] References Cited

U.S. PATENT DOCUMENTS

| | | |
|---|---|---|
| 3,262,528 | 7/1966 | Weir . |
| 4,090,596 | 5/1978 | Blair .................. 192/58 B |
| 4,312,433 | 1/1982 | Bopp .................. 192/58 B |
| 4,458,798 | 7/1984 | Bopp .................. 192/58 B |

FOREIGN PATENT DOCUMENTS 2439256 2/1976 Fed. Rep. of Germany .
2212367 11/1980 Fed. Rep. of Germany .

Primary Examiner—Larry Jones
Attorney, Agent, or Firm—Schwartz, Jeffery, Schwaab, Mack, Blumenthal & Evans

[57] ABSTRACT

Disclosed is a fluid friction clutch controlled as a function of temperature and/or rotation speed, comprising a driving primary member comprising a first reservoir chamber and an overflow orifice, wherein the primary member further comprises a device, responsive to the rotation speed of the primary member, for controlling the flow of a working fluid through the overflow orifice; a driven secondary member surrounding the primary member and optionally comprising a partition which defines a second reservoir chamber; a working chamber disposed between the primary and secondary members, optionally comprising pump means for controlling the flow of working fluid from the working chamber to the second reservoir, and an optional valve, located in the partition and being responsive to temperature, for controlling the flow of working fluid between the second reservoir chamber and the working chamber.

15 Claims, 2 Drawing Figures

FLUID FRICTION CLUTCH

BACKGROUND OF THE INVENTION

The present invention relates to a fluid friction clutch which is controlled as a function of temperature and rotational speed, and to a fluid friction clutch controlled solely as a function of rational speed. In clutches of this type, a driving primary member and a driven secondary member are provided, between which is situated a working chamber for containing a viscous fluid. The primary member is further provided with a reservoir chamber such that a fluid connection is provided, which is controllable with respect to the degree of its opening.

Fluid friction clutches of this general type are known from German Offenlegungsschrift No. 24 39 256. This known type of clutch has several disadvantages. It has a relatively deep dimension in the axial direction as a result of the cylindrical working surfaces; the superposition of the effects of temperature and rational speed on one control element leads to an inadequate control behavior of the clutch; and because of the fastening of the control element to the primary member, a relative movement between the valve lever and the actuating pin occurs which is accompanied by undesirable friction.

SUMMARY OF THE INVENTION

It is therefore an object of the present invention to provide a smaller, lighter fluid friction clutch with an improved control behavior.

It is another object of the present invention to provide a clutch as above, which safely disengages above a predetermined number of revolutions per minute and engages below a predetermined number of revolutions per minute.

Yet another object of the invention is to provide a clutch as above, wherein the range within which disengagement and engagement occurs is as small as possible.

Still another object of the invention is to provide a clutch as above, wherein friction between the valve and the actuating pin is eliminated.

A further object of the invention is to provide a clutch as above, wherein the effects of temperature and rotational speed on the engagement and disengagement of the clutch are clearly distinct from each other.

Yet a further object of the invention is to provide a fluid friction clutch which has an extended life, and which minimizes heating effects and power loss.

In accomplishing the foregoing objects, there has been provided in accordance with one aspect of the present invention, a fluid friction clutch controlled as a function of temperature and rotation speed, comprising a driving primary part comprising a first reservoir chamber with an overflow orifice, wherein the chamber is provided with an rpm dependent element; a driven secondary part which surrounds the primary part and comprises a partition wall which defines a second reservoir chamber, wherein the partition is provided with a temperature controlled valve; and a working chamber. The working chamber is disposed between the primary and secondary parts, and comprises a pumping element for transferring fluid from the working chamber to the second reservoir. Communication between the working chamber and the first reservoir is regulated by means of the rpm-dependent element; communication from the working chamber to the second reservoir is regulated by means of the pumping element; and communication from the second reservoir into the working chamber is regulated by means of the temperature controlled valve. The rpm-dependent element comprises a centrifugally actuated retaining body disposed within the first reservoir and radially displaceable through an overflow orifice into the working chamber. The retaining body is mounted on a pivoting arm which is biased by a reset spring, and the cross-section of the retaining body is less than the cross-section of the overflow orifice.

There has been provided in accordance with another aspect of the present invention a fluid friction clutch controlled solely as a function of rotational velocity, comprising a driving primary part which includes a reservoir, an overflow orifice, and a centrifugally actuated retaining body wherein the retaining body is radially displaceable within the overflow orifice; a driven secondary part; and a working chamber formed between the primary and secondary part. Communication between the working chamber and the reservoir is regulated by means of the centrifugally actuated retaining body.

Further objects, features and advantages of the present invention will become apparent from the detailed description of preferred embodiments which follows, when considered together with the attached figures of drawing.

BRIEF DESCRIPTION OF THE DRAWINGS In the drawings:

FIG. 1 shows an axial section through one embodiment of the fluid friction clutch according to the invention; and FIG. 2 shows a partial frontal view in the direction of the clutch axis (in the direction of arrow X).

DETAILED DESCRIPTION OF PREFERRED EMBODIMENTS

Figure 1:
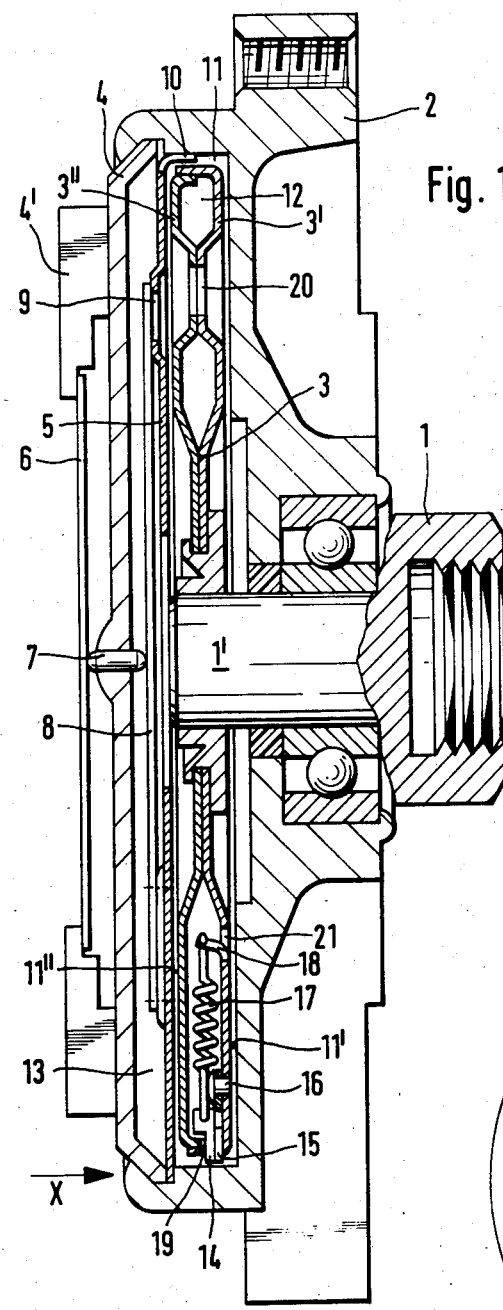

The present invention provides a fluid friction clutch, wherein, by means of a partition, a reservoir is created on the secondary side in addition to the reservoir on the primary side. Furthermore, the flow from the reservoir on the secondary side into the working chamber is actuated by a temperature dependent control, and the filling and evacuation of the reservoir on the primary side is actuated by a control dependent on the rotational speed. On the one hand, this eliminates friction between the valve lever and the actuating pin, and on the other hand, there is a clean separation between the effects of temperature and rotational speed on the control of filling and thus the engagement and disengagement behavior of the clutch. The engagement and disengagement points are thus no longer dependent on the temperature of tha air impacting the clutch, but only on the drive speed of the clutch, i.e., the rpm of the engine. This is especially advantageous, when the vehicle in which the clutch has been installed to drive the fan is travelling at a high velocity and, therefore, sufficient cooling air is available as a result of the dynamic pressure; but, wherein the clutch could in any case be actuated in the case of high ambient temperatures. At high motor rpm, a large difference in rotational speed will result, leading to a high slippage, and thus an unacceptably high heating effect and loss of power. By means of a reliable disengagement at a defined rpm, the invention avoids these undesirable losses of power, thereby extending the life of the clutch and increasing the output of the drive engine.

According to one preferred embodiment of the invention, a centrifugally-actuated, radially-movable retaining body is arranged in the reservoir chamber on the primary side, which, under the effect of the centrifugal force, can be moved into the work chamber. It is possible by means of this simple structural measure to transfer the viscous fluid from the working chamber into the reservoir chamber on the primary side above a predetermined rpm, thereby controlling the clutch. According to a further preferred embodiment of the invention, the retaining body is mounted on a pivoting arm so that the retaining body is capable of radial motion. The retaining body is thus arranged by simple means, in a functionally secure and space saving manner within the reservoir chamber on the primary side.

According to further preferred embodiments of the present invention, the working space is formed by a preselected number of axial gaps between plane parallel working surfaces of the primary member and the secondary member. By this so-called "disk construction" of the clutch, a substantially lesser structural depth is required. In another embodiment of the invention, the disks of the primary member are made of stamped sheet metal or a synthetic resin material, thereby reducing the weight and the production costs of the clutch.

The invention is not restricted to temperature *and* rpm controlled fluid friction clutches, but may also be advantageously used in rpm controlled fluid friction clutches. By the location of the centrifugally controlled retaining body in the primary member, the reservoir on the primary side in such clutches (without a reservoir on the secondary side) can be filled with the viscous fluid when a predetermined rpm is exceeded, thereby disengaging the clutch.

Figure 2:
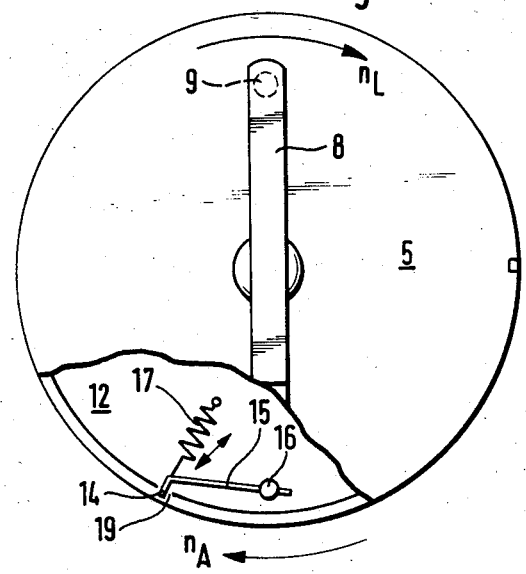

FIG. 1 shows a section of a fluid friction clutch of the type used for example to drive fans in water cooled engines of automotive vehicles. The drive member 1 of the clutch is usually attached to the internal combustion engine of the vehicle and carries on a driven shaft butt 1' the hollow drive disk 3, which together with the drive member 1 forms the so-called primary member. On the driven side, a clutch housing 2 is arranged, supported rotatably with respect to the drive member 1 and closed by a cover 4 on the frontal side, with a partition 5 clamped between the housing and the cover. The cover 4 is provided on its front side with a plurality of cooling ribs 4' under which a temperature-sensitive element, a bimetal strip 6, is mounted. The movements of element 6 are transmitted by means of an actuating pin 7 to a valve lever 8, which is attached resiliently to the partition 5 such that it can open or close an orifice 9 in the partition 5. A retaining body 10 is molded onto the partition 5 at its outer periphery, said body 10 protruding in the form of a projection axially into a working chamber 11 between the primary disk 3 and the secondary member 2. The primary disk 3 is formed by two sheet metal disks 3', 3" stamped in the shape of shells, forming therebetween a reservoir chamber 12 on the primary side. The partition 5 and the clutch cover 4 form a further reservoir chamber 13 on the secondary side. Between the partition 5 on the secondary side and the clutch housing 2, on the one hand, and the frontal surfaces of the primary disk 3, on the other, axial gaps 11', 11" are formed, which are part of the working chamber 11. Within the reservoir 12 on the primary side is located a retaining body 14, displaceable radially in the inward and outward directions. Retaining body 14 penetrates through an overflow orifice 19 in the external cylindrical surface of the primary disk 3. The retaining body 14 is smaller in its cross section than the cross section of the overflow orifice 19, so that with the retaining body 14 fully extended an overflow section remains free between the working chamber 11 and the reservoir 12 on the primary side. In order to assure the radial movement of the retaining body 14, it is mounted on the end of a pivoting arm 15, the other end of which is fastened by means of a pivot 16 to the primary disk 3, as seen with particular clarity in FIG. 2. One end of a reset spring 17 is applied against the outer portion of the pivoting arm 15, and the other end is attached to an abutment 18 of the primary disk 3. The clutch is partially filled with a viscous medium, for example, with a commercially available silicone oil, which is located, depending on the operating state of the clutch, in one of the three chambers, i.e., the primary and secondary side reservoirs 12 or 13, or in the working chamber 11. For fluid mechanical reasons, three passage orifices 20 and vents 21 are provided in the primary disk.

The mode of operation of the clutch is as follows: Below a predetermined drive rpm, the clutch operates under a temperature control only, similarly to the known fluid friction clutches. In the case of a low air flow temperature, the bimetal element 6, as shown in FIG. 1, assumes a slightly extended position, so that the valve lever 8 closes the valve orifice 9 and no oil can flow from the reservoir 13 on the secondary side into the working chamber 11. Instead, the oil is returned by way of the retaining body 14 from the working chamber 11 into the reservoir 13, so that the clutch is disengaged or runs only at the idle rpm. If the temperature of the air impacting the bimetal element 6 rises, the metal bulges outwardly and the actuating pin 7 permits the valve lever 8 to lift off the valve orifice 9, so that oil may flow into the working chamber 11. The rpm of the secondary member 2, i.e., the rpm of the fan, then increases as the amount of oil present in the working chamber 11 and the axial gaps 11' and 11" determines the transferable torque and thus the revolving velocity of the fan. If the rotation speed of the drive member 1 and the primary disk 3, respectively, rises, the retaining body 14 begins to move in the radially outward directin as a result of its mass, under the effect of the centrifugal force and against the action of the reset spring 17, whereby it penetrates the overflow orifice 19 in the primary disk 3. The relative movement between the primary disk 3 and the secondary member 2 forms in front of the retaining body 14 a back-up of oil, effecting the return of the oil in the working chamber 11 into the reservoir 12 on the primary side. This removes oil from the working chamber 11 and the axial gaps 11' and 11", so that the rotational speed of the clutch decreases. The reservoir on the primary side 12 is dimensioned and laid out in such a manner that just enough oil is drawn from the working chamber 11 into the reservoir 12 to interrupt the oil circulation between the reservoir 13 on the secondary side and the working chamber 11; there remains therefore a residual volume of oil as a fluid ring in the reservoir 13 on the secondary side, located radially outside the valve orifice 9. With declining rotational speed, the retaining body 14 is again moved in the radially inward direction by the force of the reset spring 17, so that no more oil is transported from the working chamber 11 into the reservoir 12 on the primary side. At this point, the direction of transport through the overflow orifice 19 is reversed, since the oil is forced outside through the overflow orifice 19 into the working chamber 11 by the centrifugal effect. The rotation speed of the fan now increases, because the circulation between the reservoir 13 on the secondary side and the working chamber 11 is again closed.

What is claimed is:

1. A fluid friction clutch controlled as a function of temperature and rotational speed, comprising:
   a driving primary member comprising a hollow drive disk and a drive member, said drive disk comprising a first reservoir chamber and an overflow orifice, said orifice positioned on the circumferential surface of said drive disk;
   a driven secondary member surrounding said primary member and comprising a partition which defines a second reservoir chamber;
   a working chamber disposed between said primary and secondary members, comprising pump means for controlling the flow of working fluid from said working chamber to said second reservoir;
   a centrifugally actuated retaining body for regulating flow of a working fluid, and for directing the working fluid into the first reservoir chamber, wherein the retaining body is radially displaceable within the overflow orifice between a first position within said first reservoir chamber and a second position within said working chamber; and
   valve means, located in said partition and being responsive to temperature, for controlling the flow of working fluid between said second reservoir chamber and said working chamber.

2. A fluid friction clutch according to claim 1, further comprising a pivoting arm, said retaining body being mounted on the pivoting arm such that it may be radially displaced through said overflow orifice, and a reset spring biasing said retaining body in a radially inward direction.

3. A fluid friction clutch according to claim 1, wherein said working chamber is defined by plane parallel frontal working surfaces of the primary member and parallel opposing working surfaces of the secondary member, including a plurality of gaps disposed axially between said working surfaces.

4. A fluid friction clutch according to claim 1, wherein the primary member comprises two disks which define the first reservoir chamber therebetween.

5. A fluid friction clutch according to claim 4, wherein the disks comprise stamped sheet metal.

6. A fluid friction clutch according to claim 4, wherein the disks comprises a synthetic resin.

7. A fluid friction clutch according to claim 1, wherein said temperature-controlled valve comprises a temperature-sensitive bimetal element, an actuating pin in contact with said bimetal element and a valve lever in contact with said pin, wherein thermal expansion of the bimetal releases pressure from the actuating pin, thereby allowing the valve lever to assume an open position.

8. A fluid friction clutch controlled as a function of rotational speed, comprising:
   a driving primary member comprising a hollow drive disk and a drive member, said drive disk comprising a reservoir and an overflow orifice in said reservoir said overflow orifice positioned on the circumferential surface of said drive disk;
   a driven secondary member surrounding said primary member;
   a working chamber formed between the primary and secondary members and in communication with the reservoir; and
   a centrifugally actuated retaining body for regulating flow of a working fluid, and for directing the working fluid into the reservoir, wherein the retaining body is radially displaceable within the overflow orifice between a first position within said reservoir and a second position within said working chamber.

9. A fluid friction clutch according to claim 8, wherein the primary member and the secondary member have plane parallel frontal working surfaces, and the working chamber comprises axial gaps arranged between said working surfaces.

10. A fluid friction clutch according to claim 8, wherein the primary member comprises two disks which define the reservoir therebetween.

11. A fluid friction clutch according to claim 10, wherein the two disks comprise stamped sheet metal.

12. A fluid friction clutch according to claim 10, wherein the two disks comprise a synthetic resin material.

13. A fluid friction clutch according to claim 8, wherein the cross-section of the retaining body is less than the cross-section of the overflow orifice.

14. A fluid friction clutch according to claim 8, further comprising a pivoting arm, said retaining body being mounted on the pivoting arm such that it may be radially displaced through said overflow orifice, and a reset spring biasing said retaining body in a radially inward direction.

15. A fluid friction clutch controlled as a function of temperature and rotational speed, comprising:
   a driving primary member which comprises a hollow drive disk and a drive member, said drive disk comprising an overflow orifice positioned on the circumferential surface of said drive disk;
   a driven secondary member surrounding said primary member and comprising a partition axially positioned from said drive disk within said secondary member;
   a three chamber working fluid system which includes:
      a first reservoir chamber within said hollow drive disk,
      a second reservoir chamber disposed between a cover of said secondary member and said partition, and
      a working chamber disposed between said primary and said secondary members;
   temperature responsive valve means positioned on said partition for controlling the flow of working fluid between said second reservoir chamber and said working chamber; and
   a centrifugally actuated retaining body for controlling and directing the flow of working fluid between said working chamber and said first reservoir chamber, wherein the retaining body is radially displaceable within said overflow orifice between a first position within said first reservoir chamber and a second position within said working chamber.

* * * * *